Nov. 13, 1928.

E. W. TEMPLIN

1,691,742

RUNNING GEAR FOR MOTOR VEHICLES

Original Filed June 30, 1921    6 Sheets-Sheet 6

Inventor
Ellis W. Templin,

By

Attorney

Patented Nov. 13, 1928.

1,691,742

UNITED STATES PATENT OFFICE.

ELLIS W. TEMPLIN, OF PHILADELPHIA, PENNSYLVANIA, ASSIGNOR TO THE GOODYEAR TIRE & RUBBER COMPANY, OF AKRON, OHIO, A CORPORATION OF OHIO.

RUNNING GEAR FOR MOTOR VEHICLES.

Original application filed June 30, 1921, Serial No 481,519. Divided and this application filed November 9, 1925. Serial No. 67,930.

My invention relates to motor vehicles and it has particular relation to braking mechanisms therefor.

In the manufacture of motor vehicles, particularly of the heavy-duty truck type, it has been found to be desirable to provide two front or steering wheels, and four rear or driving wheels. The four driving wheels are preferably mounted upon a small truck which is connected to the truck chassis through the chassis supporting springs, and are therefore movable with respect thereto. On account of the fact that the brake operating mechanism must necessarily be mounted on the chassis, and the brakes on the wheels, the relative movement therebetween, on trucks has heretofore constructed, has interfered with the proper application and release of the brakes.

One object of my invention consists in providing a mechanism for braking the rear or driving wheels which is not affected by the relative movement of the wheels and the chassis.

Another object of my invention consists in so coordinating the braking mechanisms on all of the vehicle wheels, including the front or steering wheels, so as to simultaneously apply all of the brakes.

A further object of my invention is to provide a novel system of braking whereby the service brakes may be locked in applied position, and whereby the braking action thereof may be accentuated to any desired degree.

This application is a division of my copending application, Serial No. 481,519, filed June 30, 1921, which matured into Patent No. 1,565,526, on December 15, 1925.

For a detailed description of my invention, reference may now be had to the accompanying drawing, of which

Figure 1:
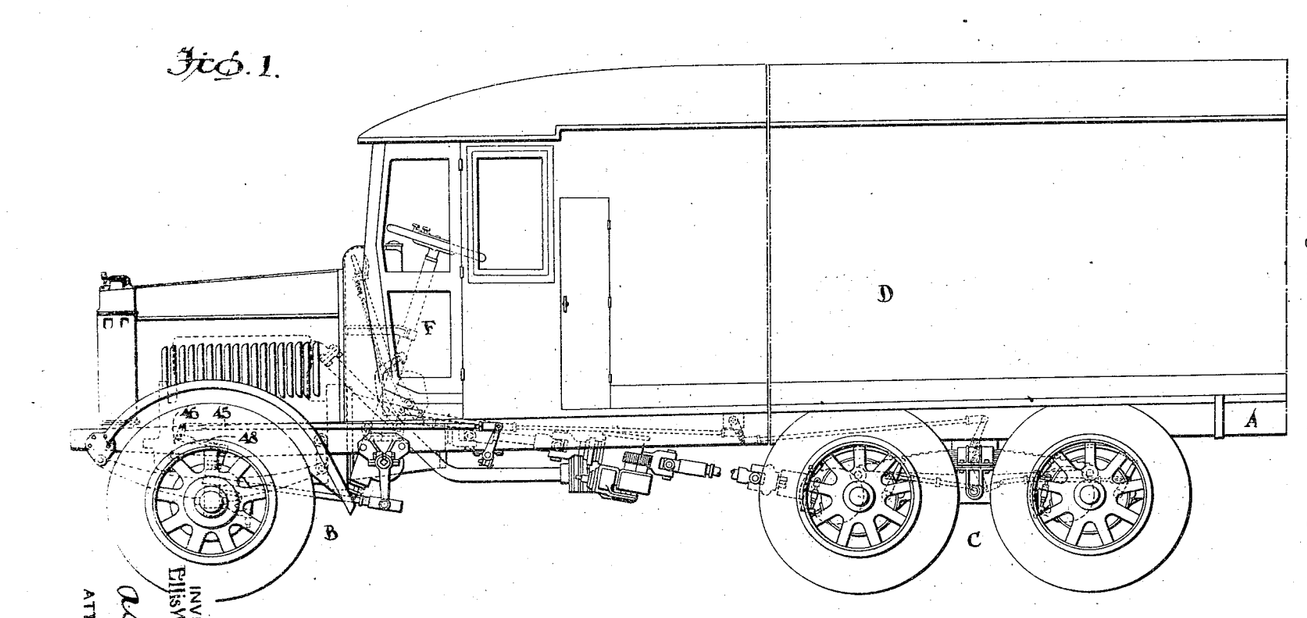
Fig. 1 is a side elevational view of a motor vehicle embodying my invention.

Referring to the drawings, the letter A designates the chassis of a motor truck, which may be of any suitable construction, and which is supported upon a front steering truck B, and a rear driving truck C. A body portion D is mounted upon the chassis A, and is provided with a steering mechanism F, as shown in Fig. 1 of the drawing, but these features are merely illustrative of a complete type of vehicle, and form, per se, no part of the present invention.

The front steering truck B embodies a spring suspended axle 9, of the usual type, provided with yoked ends 10, and any well known type of steering knuckles 11, which are connected together by means of a rod 12, and upon which steering wheels 13 are mounted. In accordance with the present invention, each wheel 13 is equipped with a suitable brake drum 14 concentrically mounted thereon. Disposed within each brake drum 14 is an expansible brake band 15, mounted so as to move therewith upon angular movement of the wheel.

Figure 5:
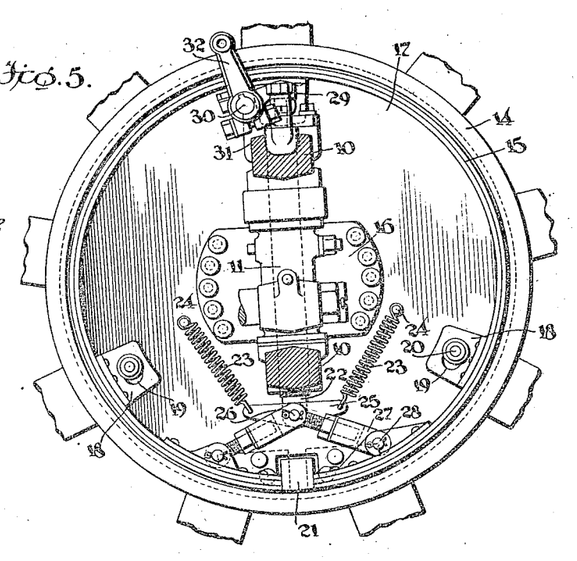
Fig. 5 is a cross-sectional view of the front wheel brake, the section being taken along the line 5—5 of Fig. 2.

An assembly of a preferred arrangement of this portion of my braking system is illustrated in Fig. 5 of the drawings, and by reference thereto it will be observed that the brake band 15 is of the split expansible type arranged to operate internally of the drum 14. A casting 16, preferably formed integrally with the steering knuckle 11, serves to support a circular disk 17 upon which the brake band 15 is movably mounted. The band 15 is provided with lugs 18, which are riveted or otherwise affixed to the band 15. The lugs 18 are provided with arcuate slots 19 adapted to receive studs 20 mounted upon the disk 17, whereby the path of movement of the band 15 with respect to the disk 17 and the drum 14 is defined during its expansive and contractive movement. To eliminate any tendency of the band 15 to rotate with respect to the disk 17, the disk is provided with an abutment 21 which projects between the split ends of the band 15.

A king pin 22 couples the steering knuckle 11 between the yoked ends 10 of the axle 9 and is utilized as an actuating rod to expand the brake band 15. As shown by the dotted lines in Fig. 5, the pin 22 projects above and below the yoked ends of the axle, and is normally held in raised position by means of tension springs 23. These springs are connected at their upper ends to the disk 17 by means of pins 24, and at their opposite ends to the lower end of the pin 22 by means of a cross-arm 25 pivotally mounted thereon by means of a pintle 26. Links 27, of adjustable length, are pivotally connected to the split ends of the band 15 by means of pins 28, and to the king pin 22 by means of the pintle 26, whereby the brake band 15 is held from engagement with the drum 14 when the pin 22 is in its normal or raised position. The pin 22 is depressed against the action of the springs 23 by means of a finger 29 fixed upon one end of a short shaft 30. The shaft 30 is journaled in a cap casting 31 which is rigidly secured upon the upper yoke arm of the axle 9. A short throw lever 32 is fixedly mounted upon the opposite end of the shaft 30, whereby the shaft and the finger 29 may be actuated to depress the king pin 22 and cause the brake band to engage the drum 14 for the purpose of braking the wheel.

Figure 2:
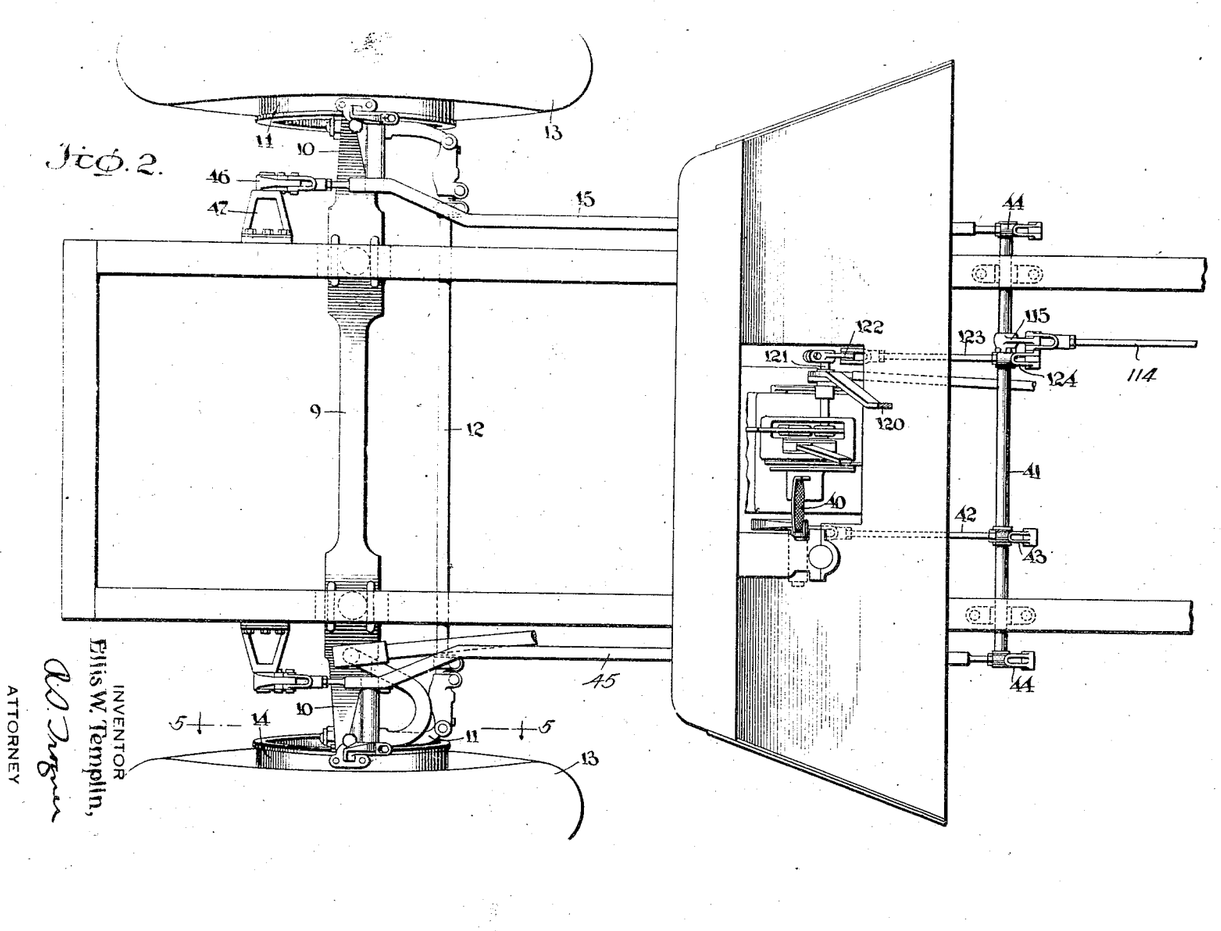
Fig. 2 is a plan view on an enlarged scale, of the front portion of the chassis of the vehicle illustrated in Fig. 1.
Figure 3:
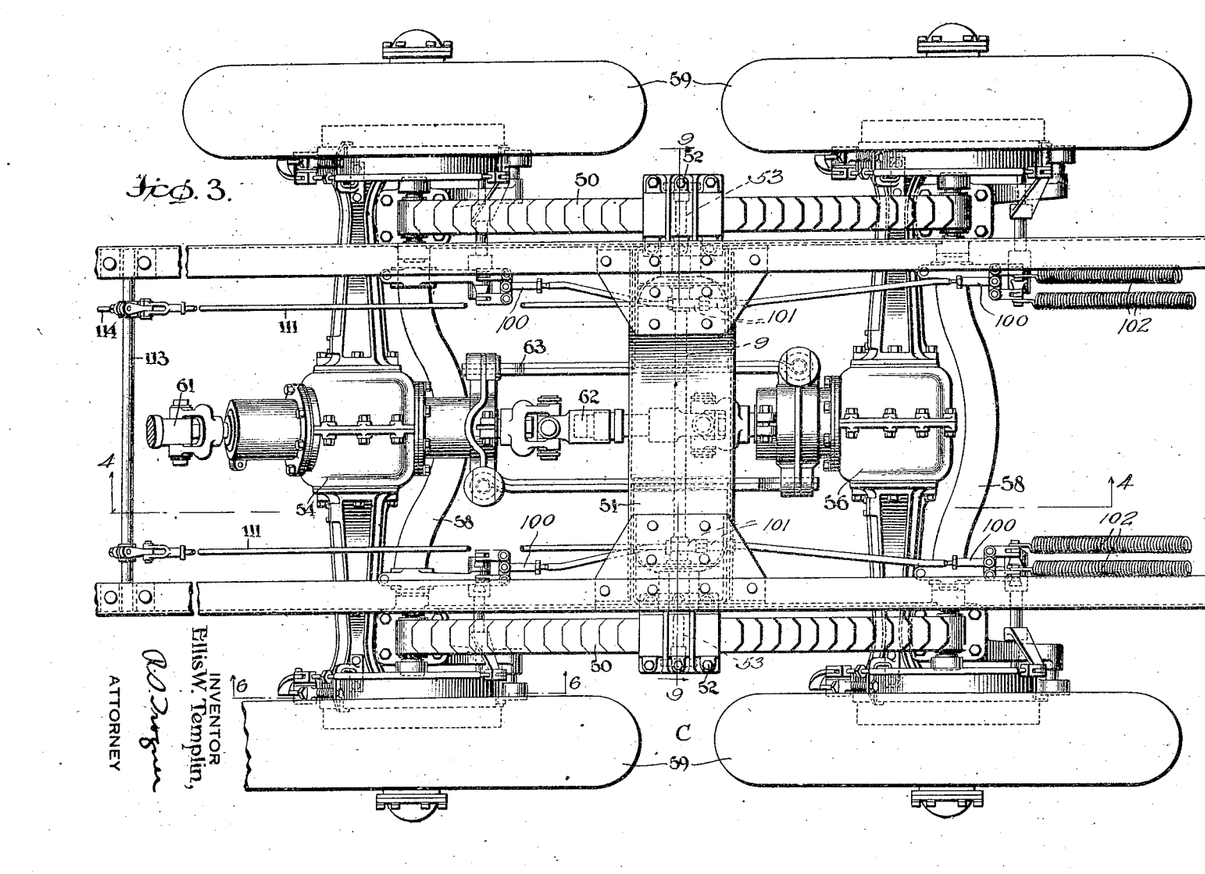
Fig. 3 is a plan view illustrating the rear portion of the chassis of the vehicle illustrated in Fig. 1.

As best shown in Fig. 2, the front wheel brakes are operated by means of a brake pedal 40 disposed adjacent the driver's seat. The pedal 40 is connected to a transversely extending shaft 41 by means of a pivoted link 42 and an arm 43 rigidly mounted upon the shaft 41. Upon each end of the shaft 41 is mounted a crank arm 44, connected, by means of a pivotally connected rod 45, to one end of a crank arm 46, which is pivotally mounted upon the chassis A by means of a supporting member 47. The other end of the crank arm 46 is connected to the arm 32 of the braking mechanism, by means of a pivoted link 48. By reason of the fact that the cap casting 31 is stationarily mounted upon the axle 9, and the actuating links are mounted upon the chassis, the movement of the wheels 13 about the pin 22 as an axis in no manner affects the actuation of the front wheel brakes.

Referring now to the driving truck C, it will be observed that the chassis is pivotally supported upon semi-elliptical springs 50 by means of brackets 51 rigidly mounted upon each side of the frame of the truck, and spring clips 52, each connected to the center of the spring 50, and to the adjacent bracket by means of a pintle 53. The springs 50 are in turn supported at the front end by being pivotally mounted upon a front axle housing 54 by means of a pintle 55, and is similarly mounted upon a rear axle housing 56 by means of a pintle 57. Each of the axle housings 54 and 56 comprises a dead axle 58, upon each end of which a drive wheel 59 is mounted and a live axle 60 by means of which the wheels 59 are driven.

By means of a drive shaft 61, power is transmitted to the housing 54 to drive the front pair of drive wheels 59, and by means of a driving connection 62 between the housings 54 and 56, power is transmitted to the housing 56 to actuate the rear drive wheels 59. The housings 54 and 56 are also connected together by means of a torque neutralizing mechanism 63, as described in my copending application Serial No. 481,519.

Figure 4:
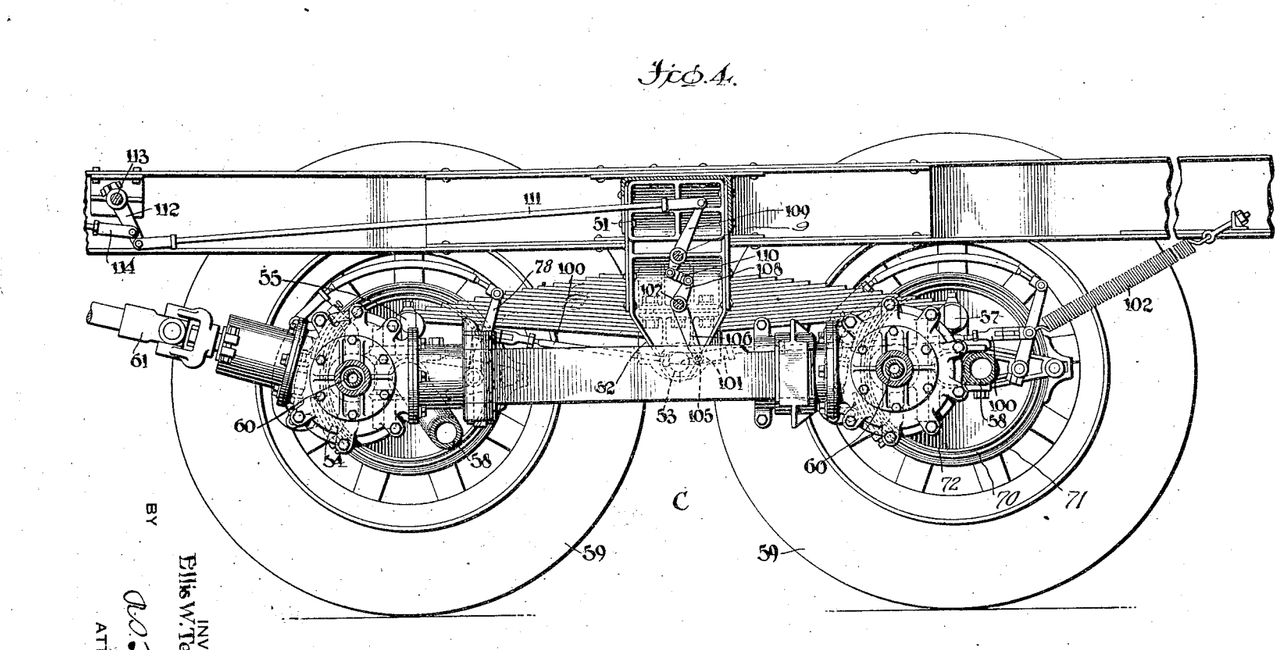
Fig. 4 is a longitudinal section of the structure illustrated in Fig. 3, the section being taken along the line 4—4 thereof.
Figure 6:
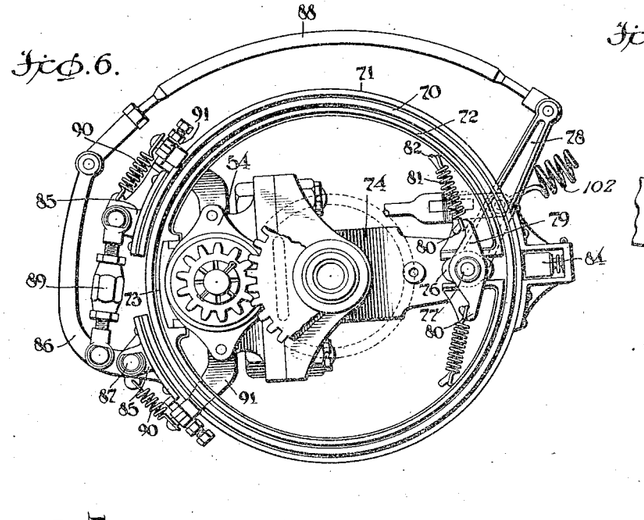
Fig. 6 is a cross-sectional view of the rear wheel brakes, the section being taken along the line 6—6 of Fig. 3.

As best shown in Figs. 4 and 6, the braking mechanism employed on the rear wheels comprises a brake drum 70 rigidly mounted upon the wheel, a cooperating external brake band 71 and an additional cooperating internal brake band 72. The brake band 72 is of the usual split type and is supported at its central point 73 upon the end of the adjacent axle housing 54 or 56, as the case may be. Rigidly mounted upon the end of the axle housing is an arm 74, upon which the usual brake actuating mechanism is mounted. This mechanism consists of an elliptical cam 76 rigidly mounted upon one end of a shaft 77, upon the opposite end of which a brake actuating arm 78 is mounted. Also, rigidly secured upon the shaft 77 is a member 79 provided with two diametrically opposite arms 80, to the ends of which tension springs 81 are secured, the opposite ends of the springs being secured to hooks 82 mounted upon the brake band 72. The tendency of the springs 81 is to maintain the member 79 in a substantially vertical position, thus maintaining the brake band 72 in its contracted or non-braking position.

The external brake band 71 is also of the split type and is supported at the central portion by means of a supporting and adjusting member 84, which constitutes a portion of the arm 74. Each end of the brake band 71 is provided with a lug 85. A brake actuating arm 86 is pivotally mounted upon the lower lug 85 by means of a pin 87, and is pivotally connected at its upper end to the brake actuating arm 78 by means of an arcuate connecting rod 88 of adjustable length. The upper lug 85 is connected to the actuating arm 86 by means of a pivotally associated connecting arm 89, also of an adjustable length. Each of the lugs 85 has connected thereto a tension spring 90, the opposite end of which is connected to an arm 91 which, in turn, is rigidly mounted upon the axle housing 54 or 56, as the case may be. From this description it will be apparent that when the arm 78 is moved in a counter-clockwise direction about the axis of the shaft 77, it will rotate the cam 76 so as to cause the internal brake band 72 to expand and engage the brake drum 71, and will cause the arm 86 to tend to move about the pin 87 as an axis, thus causing the connecting rod 89 to draw the upper end of the brake band 71 toward the lower arm. The spring supporting arms 91 serve as a guide for the brake band 71, but do not interfere with movement thereof in applying or releasing the brake.

In order to actuate the brake mechanism described, a connecting rod 100 is pivotally connected to each of the arms 78, the rod 100 connected to the arm 78 of the housing 56 extends forwardly and is connected in screw-threaded engagement to a connecting member 101. In like manner, the arm 100 connected to the arm 78 of the front housing 54 extends rearwardly and is connected to a member 101. The arms 78 of the housings are connected to the chassis A by means of tension springs 102. It will be observed that the brakes of the two sets of wheels are so connected by means of the members 100 and 101 that a forward movement of the rods 100 will serve to cause both brakes to exert a braking action upon their respective wheels, and the tension springs 102 serve to maintain normally both brakes in a released position. The connecting member 101 is pivotally connected by means of a pin 105 to a crank arm 106 pivotally mounted upon a shaft 107 mounted on the bracket 51. It should be noted that the path of movement of the pin 105, and therefore of the member 101, is but relatively short, and passes directly through the axis of the shaft 53 about which the truck C pivots, so that irrespective of any movement of the truck about its axis, and irrespective of the relative positions of the several wheels of the truck, the braking action will be substantially unaffected.

The arm 106 is actuated by a lever arm 108 which is connected to a crank arm 109 by means of a pivoted link 110, in such manner that movement of the arm 109 in a forward direction will serve to apply the brakes to the wheels. The crank arm 109 is rigidly secured to a transverse shaft 9 and is actuated by means of a pivotally associated connecting rod 111 which, in turn, is connected to a crank arm 112 pivotally mounted upon an intermediately disposed cross shaft 113. The arm 112 is in turn actuated by a connecting rod 114 which is connected to the shaft 41 by means of a rigidly mounted crank arm 115. It will be observed that the brake rods 111 on each side of the chassis are connected to the intermediate shaft 113, but by reason of the arms 112 being rigidly secured thereto, only a single connecting rod 114 is necessary to effect a cooperative movement of the shaft 41 and the shaft 113.

From the foregoing description, it will be apparent that when the brake pedal 40 is actuated by the driver, the shaft 41 is rotated, and by means of the brake rods 45 the brakes on the front wheels will be applied; and by means of the rods 111 and 114 and their associated mechanisms, the several brakes on each of the four rear wheels will be applied. By reason of the application of the braking action on the front wheels through the king pin 22, the angular movement of these wheels will in no manner affect the application or the release of the brakes, and similarly, by reason of the application of the braking force to the wheels of the truck C through a locus concentric with the shaft 53, the relative positions of the rear wheels 59 will have no effect upon the application or release of the brakes. Therefore, the movement of the pedal 40 serves to apply a braking action on all six wheels simultaneously, which is entirely independent of the relative positions of any of the wheels or any of the housings thereof.

Figure 7:
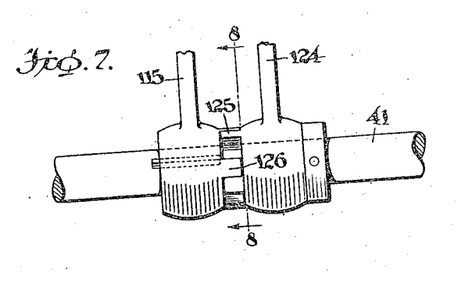
Fig. 7 is a side elevational view of a novel type of brake interlocking mechanism incorporated in my invention.
Figure 8:
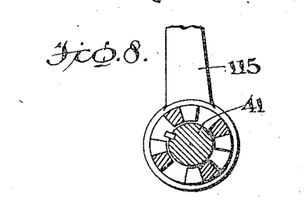
Fig. 8 is a cross-sectional view of the brake interlocking mechanism illustrated in Fig. 7, the section being taken along the line 8—8 thereof.
Figure 9:
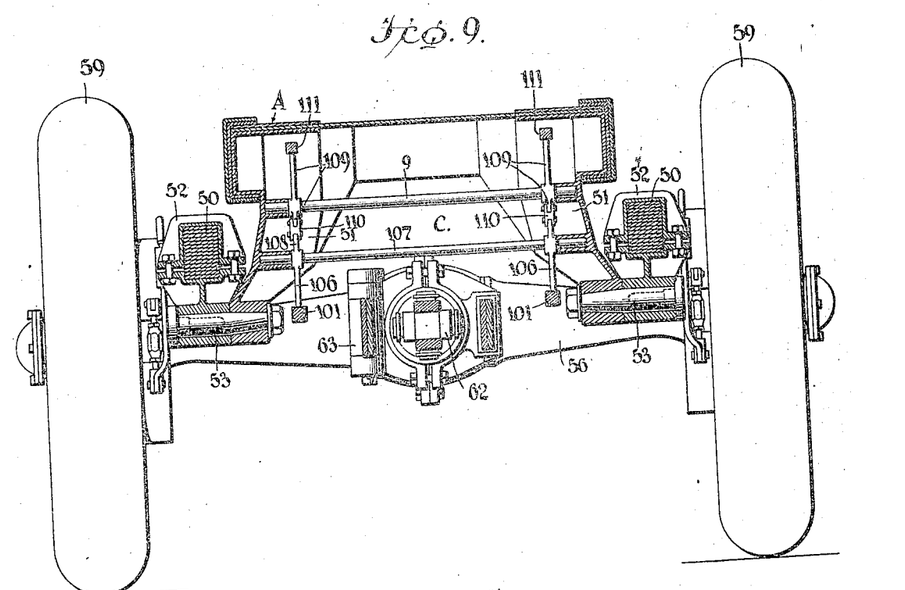
Fig. 9 is a transverse sectional view of a portion of the structure illustrated in Fig. 3, the section being taken substantially along the line 9—9 indicated thereon.
Figure 10:
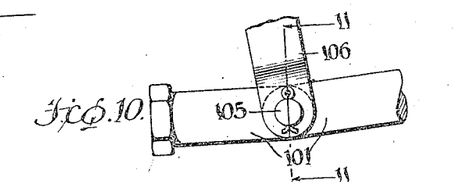
Fig. 10 is a fragmentary detail view on a larger scale of a portion of the brake operating mechanism.
Figure 11:
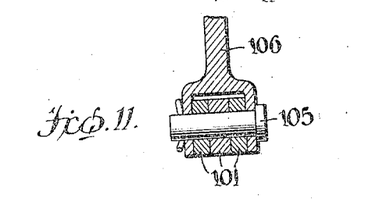
Fig. 11 is a sectional view taken substantially along the line 11—11 of Fig. 10.

In addition to the brake actuating foot pedal 40, I have provided an emergency brake lever 120 rigidly mounted upon a shaft 121 which, in turn, has rigidly mounted thereon a crank arm 122. The crank arm 122 has pivotally secured thereto a connecting rod 123, the opposite end of which is pivotally connected to a crank arm 124 pivotally mounted on the shaft 41. As best shown in Figs. 7 and 8, the arm 124 is provided with a clutch member 125 secured thereto which cooperates with a clutch member 126 constituting a portion of the crank arm 115. The clutch member 125 consists of a plurality of teeth or segments which are adapted to be moved within the same circumferential path as cooperating teeth or segments of the clutch member 126. The clutch teeth or segments are so arranged that when neither of the brake levers 40 or 120 are in their actuated positions, the teeth of the clutch members are in engagement. When the lever 40 is alone actuated, the teeth of the member 126 move away from the teeth of the member 125 as the arm 115 applies the brakes. When the lever 120 is alone actuated, the teeth of the member 125 immediately forcibly engage the teeth of the member 126, thus rotating the lever 115 and applying the brakes. If the lever 40 has already been actuated, and the emergency brake lever is operated, it will move freely until the clutch teeth are in engagement, whereupon it assumes the pressure formerly assumed by the lever 40 and enables the operator to increase the braking action on the wheels, by reason of the greater leverage afforded by the emergency brake.

From the foregoing description, it will be apparent that upon the application of the brakes, a braking action will be transmitted to each of the front wheels of the truck, irrespective of the position which they are then occupying, and in a like manner the braking action will be transmitted to each of the four wheels of the rear truck, irrespective of what position the truck may be occupying with respect to the chassis. Also, it will be apparent that on the four rear wheels the external and internal brakes will be applied simultaneously. It will be further observed that by reason of the clutch arrangement interconnecting the service brake lever 40 and the emergency brake lever 120, the brake 40 may be actuated independently of the lever 120, and the lever 120 may be operated without actuating the lever 40, or may be employed in addition thereto in order to increase the braking action over that obtainable by means of the lever 40 alone.

Although I have illustrated but one form which my invention may assume, and have described in detail but one application thereof, it will be apparent to those skilled in the art that it is not so limited but that minor modifications and changes may be made therein without departing from the spirit of my invention or the scope of the appended claims.

What I claim is:

1. In a motor vehicle, the combination with a chassis, including a driving truck mounted to oscillate thereon about a horizontal axis, of a plurality of axles for the truck, a housing for each axle, individual brake mechanisms for the truck wheels mounted upon the associated housings, reach rods pivoted together adjacent the axis of oscillation of the truck and connecting the brake mechanisms of all the wheels on one side of the truck, and devices upon the chassis operable to move the pivot of the reach rods into concentric relation with said axis of oscillation to set said brake mechanisms.

2. In a motor vehicle, the combination with a chassis, of a driving truck element resiliently mounted thereon to oscillate about a substantially horizontal axis and comprising a plurality of wheel carrying axles, a plurality of brake elements, a pivoted throw lever having its pivot arranged in substantially fixed relation to the chassis, and draw links connecting the brake mechanisms respectively to the throw lever at a point adapted to move in an arc intersecting the axis of oscillation of the truck element.

3. In a motor vehicle, the combination with a chassis, including a driving truck mounted to oscillate thereon about a horizontal axis, of a plurality of axles for the truck, wheels mounted upon the axles, individual brake mechanisms for the truck wheels mounted upon the housings, reach rods pivoted together adjacent said axis of oscillation connecting the brake mechanisms of each housing, and devices upon the chassis operable to move the pivot of the reach rods into concentric relation with said axis of oscillation to simultaneously set said brake mechanisms.

4. In a motor vehicle, the combination with a chassis, including a driving truck mounted to oscillate thereon about a horizontal axis, of a plurality of axles for the truck each provided with wheels, individual brake mechanisms for each truck wheel comprising separate associated braking units, means pivotally connecting associated units of one wheel with similar units of the opposite wheel at a point adjacent said axis of oscillation, and devices upon the chassis operable to move the pivotal connection into concentric relation with said axis to simultaneously set said braking units.

5. In a motor vehicle, the combination with a chassis, including front steering wheels, of a driving truck comprising a plurality of wheel carrying axles mounted upon the chassis to oscillate as a unit about a horizontal axis, a housing for each axle, individual brake mechanisms for each truck wheel, means pivotally connecting the brake mechanisms of each housing at a point adjacent said axis of oscillation, devices upon the chassis operable to move said pivotal connection into concentric relation with said axis to set said brakes, individual brake mechanism for each steering wheel adapted to swing therewith, and brake control elements connecting said devices and the front wheel brake mechanisms for simultaneous operation.

6. In a motor vehicle, the combination with a chassis, including front steering wheels, of a driving truck comprising a plurality of wheel carrying axles mounted upon the chassis to oscillate as a unit about a horizontal axis, a housing for each axle, individual brake mechanisms for each truck wheel mounted upon each housing, means pivotally connecting the brake mechanisms of each housing at a point adjacent said axis of oscillation, devices upon the chassis operable to move said pivotal connection into concentric relation with said axis to set said brakes, individual brake mechanism for each steering wheel adapted to swing therewith, and brake control elements connecting said devices and the front wheel brake mechanisms for simultaneous operation.

7. In a motor vehicle, a wheel braking mechanism, an actuating lever connected directly to said braking mechanism, and provided with a clutch face, a second actuating lever provided with a clutch face adapted to cooperate with said first mentioned clutch face to actuate said braking mechanism through the first mentioned lever.

8. In a motor vehicle, a wheel braking mechanism, an actuating lever connected directly to said braking mechanism, and a second actuating lever connected to said first mentioned lever through a clutch mechanism adapted to permit manual actuation of the first mentioned lever independently of the second, but to cause actuation of the first lever upon manual actuation of said second lever.

9. In combination a vehicle comprising a chassis supported upon a relatively movable truck element comprising a plurality of axles, wheels mounted on the axles, brake mechanisms associated with the wheels, a brake actuating member mounted on the chassis, and means connecting the brake actuating member to the braking mechanisms, said means being adapted to transmit force from the brake actuating member to the braking mechanisms substantially unaffected by the relative movement of the chassis and the truck element.

10. In a motor vehicle, a chassis, a relatively movable truck element provided with a plurality of axles having wheels mounted thereon, braking mechanism associated with the wheels, brake actuating mechanism mounted on the chassis, and means connecting the braking mechanism and the brake actuating mechanism at a point substantially unaffected by the relative movement of the chassis and the truck element.

11. In a motor vehicle, a chassis, a truck element pivotally connected to said chassis and provided with a plurality of axles having wheels mounted thereon, braking mechanism associated with the wheels, a brake actuating mechanism mounted on the chassis and having a brake operating rod connected thereto, said rod being connected with said braking mechanism at a point the movement of which is substantially unaffected by movement of the truck element about its pivotal axis.

12. In a motor vehicle, a chassis, a truck element provided with a plurality of axles having wheels mounted thereon, the truck element being connected to the chassis through a pivotal connection fixed with respect to said chassis, braking mechanism associated with each of the wheels, means for operating said braking mechanism, and brake actuating means pivotally mounted on the chassis and pivotally connected to brake operating means at a point substantially unaffected by the movement of the truck element about its point of pivotal connection to the chassis.

13. In a motor vehicle, a chassis, a truck element pivotally connected to the chassis by means of springs and comprising a plurality of axles, road engaging wheels mounted on the axles and having braking mechanisms associated therewith, a brake operating rod connected to each of the wheel braking mechanisms, a brake actuating lever pivotally mounted on the chassis and pivotally connected to the brake operating rod, the point of connection of the braking mechanism and the rod being in substantial alignment with the axis of the pivotal connection between the chassis and the truck.

In witness whereof, I have hereunto signed my name.

ELLIS W. TEMPLIN.